Patented Jan. 26, 1926.

1,570,987

UNITED STATES PATENT OFFICE.

EUGENE E. AYRES, JR., OF CHESTER, PENNSYLVANIA, ASSIGNOR TO THE SHARPLES SPECIALTY COMPANY, OF PHILADELPHIA, PENNSYLVANIA, A CORPORATION OF DELAWARE.

PROCESS FOR RESOLVING EMULSIONS.

No Drawing. Application filed April 2, 1921. Serial No. 458,124.

*To all whom it may concern:*

Be it known that I, EUGENE E. AYRES, Jr., a citizen of the United States, residing at Chester, in the county of Delaware and State of Pennsylvania, have invented a new and useful Process for Resolving Emulsions, of which the following is a specification.

This invention is a process for resolving emulsions by the use of a reagent to cause by reaction the formation in the continuous phase, in a colloidally soluble form, of a substance that will act as an emulsifying colloid soluble in or wetted by the dispersed phase to counteract the stabilizing influence of the colloids soluble in or wetted by the continuous phase.

The primary purpose of my improvement is to effect the efficient resolution of emulsions that cannot be resolved satisfactorily by previously known methods.

There is utilized in the process, the antagonisms between the hydrophile or water attracting colloids and the hydrophobe or water dispersing colloids, as means for reducing the stability of the emulsions of oil-in-water and of water-in-oil, respectively.

I have found that the desired results can be secured in some cases, not only by the addition of reagents that are colloidally soluble in the continuous phase and therefore come automatically into contact with the suspended globules and at the same time have the properties of acting as emulsifying colloids tending to reverse the form of the emulsion, but also that very efficient results may sometimes be secured more economically by the formation of the substance desired by chemical reaction in the continuous phase.

For example, a cotton seed oil soap stock, a by-product from the caustic soda refining of cotton seed oil, is an emulsion of soap-water with globules of dispersed cotton seed oil. In utilizing my principles of separation I can proceed in either of two ways—(1) I can prepare a solution of calcium oleate in a suitable solvent (such as alcohol or glycerol or the union of the two) and add the reagent so prepared to the emulsion, or (2) I can add calcium chloride to the emulsion, forming by chemical interaction with the sodium soap present sufficient calcium oleate to reduce the stability of the emulsion.

The two methods accomplish the same results, that is, the introduction of calcium oleate to the emulsion, but whereas in the first case a secondary effect may be caused by the presence of the solvent (such as alcohol or glycerol), so in the second case a secondary effect may be caused by the formation from reaction of the by-product sodium chloride. There are cases where the sodium chloride may be more of a help than a hindrance in reducing the stability of a given emulsion, and there are cases where the cost of alcohol and glycerol is too high to permit of their industrial use. For these reasons I sometimes prefer to introduce calcium oleate by reaction, as described, rather than add the calcium oleate in the form of a soluble reagent.

The addition of a solution of calcium chloride to a soap-water-oil emulsion, particularly when the concentration of soap is high, brings about an immediate precipitation of calcium oleate in large particles or clumps. This localized reaction is of some value in reducing the stability of the emulsion, but I have found that when the calcium oleate is formed in a colloidally soluble form in the continuous phase it is possible to recover oil from concentrated soap emulsions from which oil cannot be recovered by the usual addition of calcium chloride. The principle involved is merely that the calcium oleate formed by reaction, instead of being formed in large insoluble clumps, is in such shape that it will diffuse throughout the emulsion and come automatically into contact with the dispersed oil globules.

There are various methods for the precipitation of a colloid reagent soluble in the dispersed phase in such form that it is colloidally soluble in the continuous phase. For example, I have found that if gelatine be added to a soap emulsion and likewise to the calcium chloride solution, the calcium chloride solution may be stirred into the soap emulsion without sensible precipitation of calcium oleate. If a soap emulsion contains gelatinous impurities, it may not be necessary to add gelatine to the soap emulsion, but it is of advantage to add gelatine to the calcium chloride solution.

I have found also that if the soap emulsion contains gelatinous impurities and is viscous in character, it is possible to add a calcium chloride solution without gelatine without sensible precipitation of calcium oleate if the calcium chloride solution is extremely dilute and is stirred slowly into the viscous emulsion. This is an example of a case where gelatine need not be added to either the soap emulsion or to the calcium chloride reagent.

In the above examples I have spoken of gelatine, but there are many other substances, such as albumen and casein for instance, that act as hydrophile colloids to prevent the sensible precipitation of calcium oleate when formed and may be used instead of gelatine.

As an illustration of the use of my process, I have dissolved 9 grams of calcium chloride in 2800 grams of water, and have added the calcium chloride solution to 700 grams of viscous cotton seed oil soap stock with constant stirring. No sensible precipitation of calcium oleate could be observed. The emulsion when centrifuged with high centrifugal force yielded not only cotton seed oil that can be normally recovered by centrifugal force, but also considerable of the cotton seed oil that otherwise can be obtained only by solvent extraction.

In the foregoing discussion I have emphasized calcium chloride as a reagent and calcium oleate as the oil soluble colloid, but I do not limit myself to these substances. There are many water soluble reagents which will react with sodium soap to form oleates or palmitates or stearates that tend to offset the stabilizing influence of the sodium soap.

I have mentioned only the sodium soap emulsions for the reason that such emulsions are very common, but my process is applicable to any oil-in-water emulsion whose stability is dependent upon a water soluble emulsifying colloid, provided the continuous water phase of the emulsion contains some substance that on interaction with a water soluble reagent will form an emulsifying colloid of an oil soluble or oil wetted character.

The principles discussed above for the resolution of oil-in-water emulsions apply in the same way to the resolution of water-in-oil emulsions. The latter case involves the formation by reaction in the continuous oil phase of a hydrophile colloid in such manner that the hydrophile colloid is in colloidal suspension in the oil.

For example, if a small amount of alcoholic potash is added to a water-in-oil emulsion of crude castor oil, the free fatty acid present will react with the potash to form potassium soap. This soap is an example of a hydrophile colloid and under the above conditions, the soap will be formed in a state of colloidal dispersion in the castor oil. The emulsion will thereby become less stable and may be separated by permitting subsidence.

Having described my invention, I claim:

1. The process of resolving emulsions which consists in the addition thereto of a reagent capable of forming, by reaction in the continuous phase, a substance in a state of colloidal dispersion therein and that will act as an emulsifying colloid tending to reverse the form of the emulsion.

2. The process of separating the constituents of an emulsion which consists in the addition thereto of a reagent adapted to produce by reaction a substance which is normally insoluble in the continuous phase and which is colloidally dispersed therein and acts as an emulsifying colloid tending to reverse the form of the emulsion.

3. The process of resolving emulsions of the form of water-in-oil and oil-in-water which consists in the formation by reaction in the continuous phase of an emulsifying colloid in a state of colloidal dispersion and adapted to reverse the form of the emulsion.

4. The process of separating the constituents of oil-in-water emulsions which consists in the formation, by reaction in the water, of a hpdrophobe colloid, in a state of colloidal dispersion therein and thereby causing the dispersed globules of oil to coalesce.

5. The process of resolving vegetable oil-soap-water emulsions which consists in the formation by reaction in the continuous water phase of a hydrophobe colloid in a state of colloidal dispersion in the water.

6. The process of resolving vegetable oil-soap-water emulsions which consists in the formation by reaction in the continuous water phase, of calcium soap in a state of colloidal dispersion in the water.

7. The process of separating the oil from a cotton seed oil-soap-water emulsion, which consists in the formation by reaction in the water of calcium soap, in a state of colloidal dispersion in the water and thereby causing the dispersed globules of oil to coalesce.

In testimony whereof I have hereunto set my name this 12th day of March, 1921.

EUGENE E. AYRES, Jr.